(12) United States Patent
Duemler

(10) Patent No.: US 6,912,443 B2
(45) Date of Patent: *Jun. 28, 2005

(54) MODULAR AUTOMATED ASSEMBLY SYSTEM

(76) Inventor: David W. Duemler, 4376 Upper Ridge Rd., Pennsburg, PA (US) 18073

(*) Notice: Subject to any disclaimer, the term of this patent is extended or adjusted under 35 U.S.C. 154(b) by 52 days.

This patent is subject to a terminal disclaimer.

(21) Appl. No.: 10/316,388

(22) Filed: Dec. 11, 2002

(65) Prior Publication Data

US 2003/0083768 A1 May 1, 2003

Related U.S. Application Data

(63) Continuation-in-part of application No. 09/522,633, filed on Mar. 10, 2000, now Pat. No. 6,535,786.

(51) Int. Cl.[7] .................. G05B 11/01; G05B 19/18; G06F 19/00
(52) U.S. Cl. ................ 700/169; 700/9; 700/19; 700/112
(58) Field of Search ............... 700/9, 169, 112, 700/19; 29/38 A

(56) References Cited

U.S. PATENT DOCUMENTS

| | | | |
|---|---|---|---|
| 4,371,075 A | * | 2/1983 | Erlichman ............ 198/345.3 |
| 4,385,685 A | * | 5/1983 | Sticht .................. 198/341.01 |
| 4,492,297 A | | 1/1985 | Sticht |
| 4,823,929 A | | 4/1989 | Fleming et al. |
| 4,971,189 A | | 11/1990 | Fleming et al. |
| 5,038,318 A | | 8/1991 | Roseman |
| 5,062,052 A | | 10/1991 | Sparer et al. |
| 5,323,130 A | | 6/1994 | Arnold |
| 5,487,768 A | | 1/1996 | Zytka et al. |
| 5,802,329 A | | 9/1998 | Combs et al. |
| 5,884,746 A | | 3/1999 | Leisner et al. |
| 5,904,242 A | | 5/1999 | Swanson |
| 5,923,557 A | | 7/1999 | Eidson |
| 6,068,393 A | * | 5/2000 | Hutchins et al. ........ 700/112 |
| 6,178,608 B1 | * | 1/2001 | Koch ..................... 29/33 P |
| 6,609,042 B1 | * | 8/2003 | Kumeth ................. 700/116 |

OTHER PUBLICATIONS

Declaration of David W. Duemler, (pp. 1–8), Owner and President of DEMCO Enterprises, Inc., Jun. 5, 2000, with supporting Exhibits A–P.

* cited by examiner

Primary Examiner—Leo Picard
Assistant Examiner—Elliot L Frank
(74) Attorney, Agent, or Firm—Duane Morris LLP

(57) ABSTRACT

A method of modular manufacturing is disclosed and a modular assembly system is shown utilizing a base unit and a plurality of detachable work stations adapted to operate with the base unit. Each detachable work station includes its own work station control processor. The assembly system is preferably fully modular since each work station is capable of controlling its own operation. Work stations may be plugged into a plurality of different work station ports on the base unit in a plurality of different combinations, preferably without reprogramming either the base unit control processor or the work stations control processor.

20 Claims, 5 Drawing Sheets

MODULAR AUTOMATED ASSEMBLY SYSTEM

CROSS-REFERENCE TO RELATED APPLICATION

This application is a continuation-in-part of U.S. patent application Ser. No. 09/522,633 of David W. Duemler, filed Mar. 10, 2000, now U.S. Pat. No. 6,535,786 entitled "Modular Automated Assembly System" the entirety of which is hereby incorporated herein by reference.

FIELD OF THE INVENTION

The present invention relates to industrial assembly systems, and more particularly to modular automated assembly systems.

BACKGROUND OF THE INVENTION

Automated assembly systems have greatly improved the quality of manufactured products as well as the efficiency with which those products are made. These systems generally include a conveyor system that is controlled by a central computer. The central computer directs the conveyor system to move a product to successive work stations in order to accomplish a variety of operations on the product, such as loading, assembly, testing, rejecting, and unloading of the product.

Each work station typically includes an automated device for accomplishing a particular operation on the product. Typically, the majority of the operation of each device is directly controlled by the central computer. The central computer typically must be programmed with a very complex operating program that enables the computer to direct the operations of each individual work station device. The program may include the operating parameters and instructions for operating each device, code enabling the computer to communicate with each device, and a complex code structure interrelating the operation of each device to that of other devices in the system.

In smaller industrial applications, the central computer is typically directly wired to each work station, leading to a very complex web of connections. In larger industrial assembly systems, the central computer may communicate to each device through a network bus structure. In either application, each device is identified by a device address or network address. Therefore, each individual device must be programmed with an identifying address. If a device is removed from a network or its location in the assembly system is changed, that device must be reprogrammed with a new address identifiable to the central computer. In this manner, the central computer knows the individual location of each device and can direct the operations of each device individually.

Automated assembly systems such as just described are not easily modified and often are special purpose systems, i.e., they are only capable of assembling a single product or family of products. Significant changes to the automated assembly system require major reprogramming efforts for the central computer and any work station devices. These limitations produce a rather inflexible automation system that does not easily expand with a business or afford a business the ability to manufacture different products on the same assembly line. Further, it should be apparent that modifications to these automated systems require significant down time for the assembly system which in turn leads to costly production gaps. These systems also do not easily allow for reduced production during production cut-backs. Therefore, there is currently a need for a modular automated assembly system that is both cost effective, highly flexible, and easily adaptable.

SUMMARY OF THE INVENTION

The present invention is a modular assembly system and method of modular manufacturing. A modular assembly system includes a base unit and a plurality of detachable work stations. The base unit includes a base unit control processor, a plurality of work station ports, and a conveyor controlled by the base unit control processor. The detachable work stations are adapted to operate with the base unit and each work station includes a work station control processor for controlling the operation of the individual work station. Each of the work stations is detachably connected to one of the work station ports such that it can communicate with the base unit control processor. The base unit control processor is programmed to recognize at least one of said detachable work stations, monitor whether one of said detachable work stations successfully performs its operation on an individual product, and selectively direct the operation of at least a successive one of the detachable work stations.

The preferred embodiment of the assembly system of this invention is fully modular. Any number of combinations of work stations may be connected to the base unit to assemble modified or new products without reprogramming the base unit control processor or the work station control processor. The modular assembly system, therefore, provides an effective way for a manufacturer to minimize capital equipment expenses by offering significant opportunities to amortize equipment costs while maximizing the manufacturer's ability to react to ever-changing market demands.

The above and other features of the present invention will be better understood from the following detailed description of the preferred embodiments of the invention which is provided in connection with the accompanying drawings.

DETAILED DESCRIPTION OF THE PREFERRED EMBODIMENTS

Figure 1:
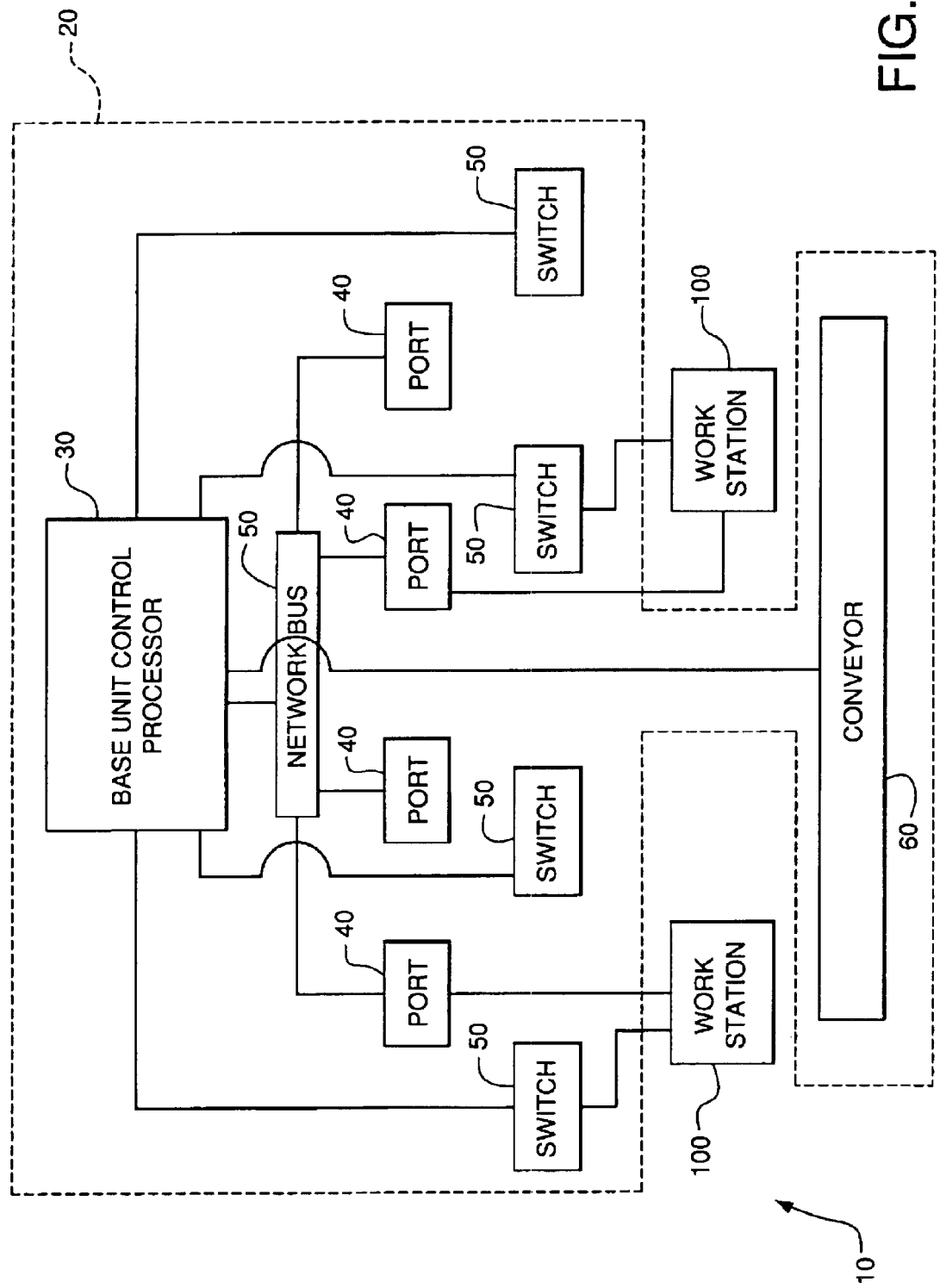
FIG. 1 is a block diagram of an exemplary embodiment of a modular assembly system according to the present invention.

FIG. 1 is a block diagram of an exemplary embodiment of a modular assembly system 10 according to the invention. The modular assembly system 10 includes a base unit 20 indicated within the dashed lines and a plurality of detachable work stations 100.

The base unit 20 includes a base unit control processor 30. The control processor 30 may be any programmable processor, such as a desktop computer, microprocessor, microcontroller, programmable logic controller, or the like. A plurality of work station ports 40 are connected to base unit control processor 30 through network bus 50. Network bus 50 is preferably a network bus that is suitable for industrial control systems. In the preferred environment, network bus 50 is a Control Area Network (CAN) bus, such as a DEVICENET bus, which allows base unit control processor 30 to communicate or interface with ports 40 using the open network standard DEVICENET protocol. Examples of other acceptable buses and protocols that may be used in industrial control systems are PROFI-BUS, LONTALK, CONTROLNET, and SDS buses and protocols.

Figure 2:
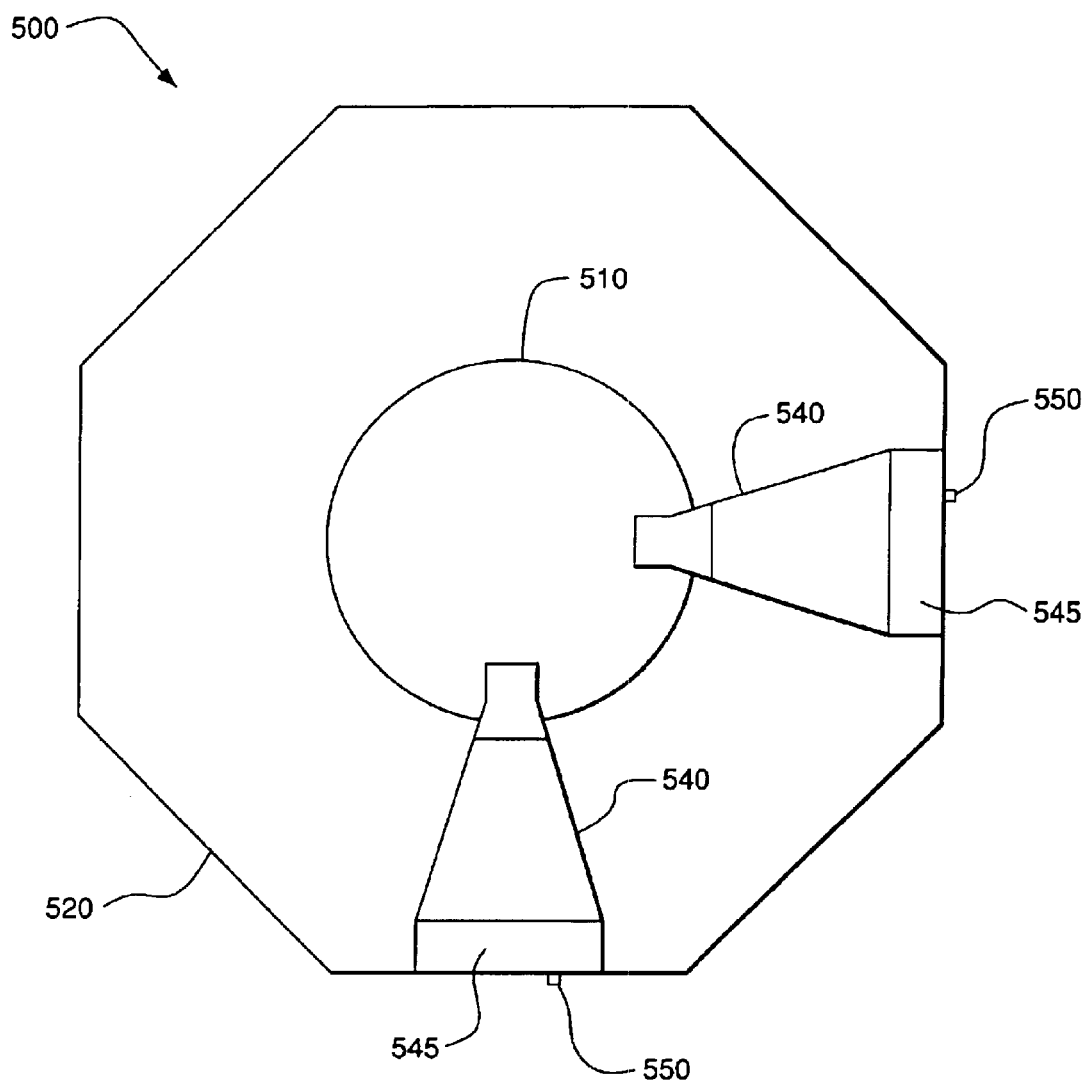
FIG. 2 is a top plan view of an exemplary base unit with dial index conveyor and two connected work stations according to the present invention.
Figure 3:
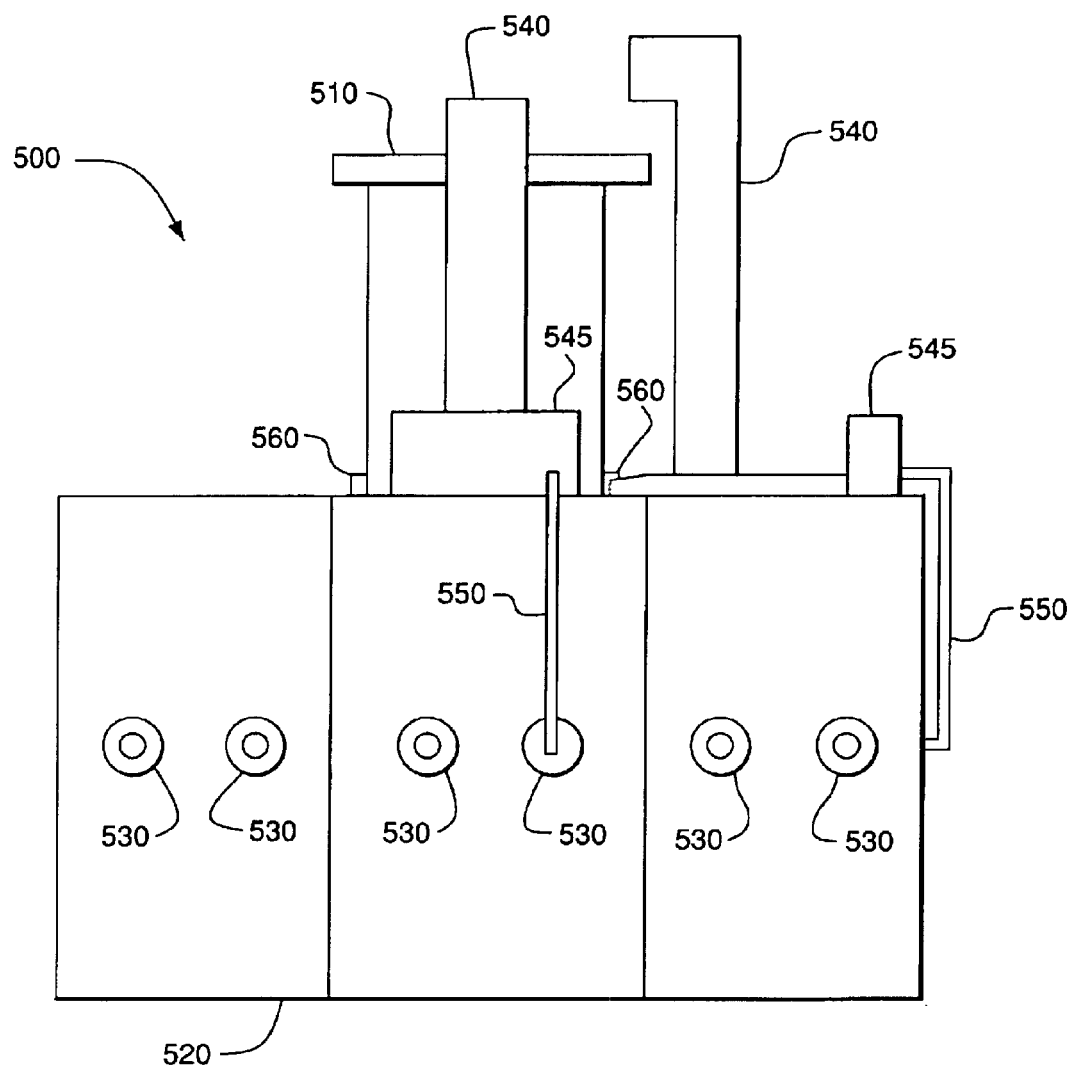
FIG. 3 is a side elevational view of the unit of FIG. 2.
Figure 4:
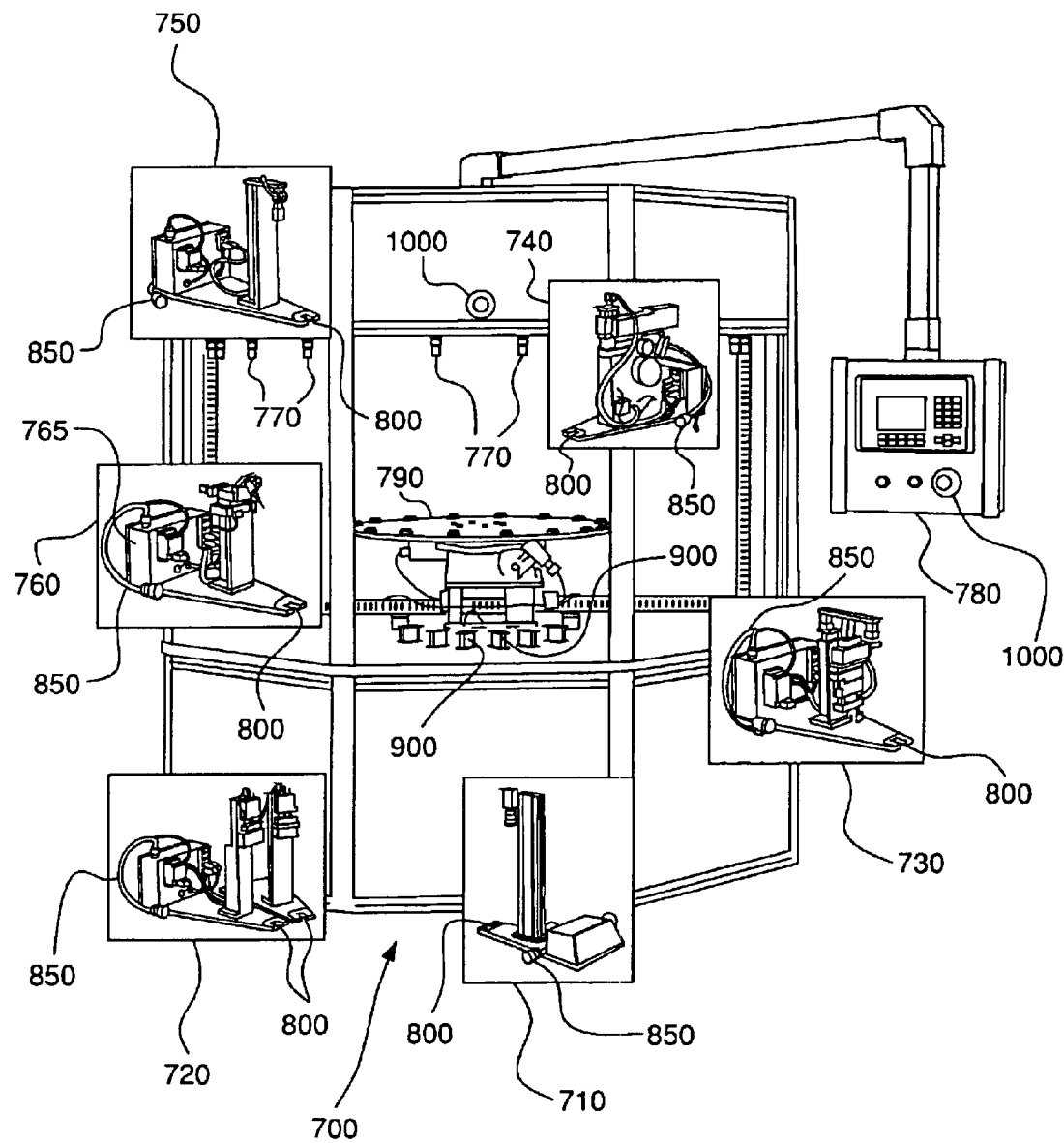
FIG. 4 is a perspective view of an exemplary base unit and exemplary work stations according to the present invention.

The base unit 20 also includes a conveyor 60. The conveyor 60 is controlled by the base unit control processor 30 and is adapted to move a product during automated assembly of the product. The conveyor 60 may be any number of conveying devices such as a dial index as shown in FIG. 2, FIG. 3, and FIG. 4, a vertical or horizontal walking beam in-line machine, an automated conveyor belt, or other conveying devices used in assembly lines to move a product through an assembly system.

Modular assembly system 10 includes a plurality of detachable work stations 100 adapted to operate with the base unit 20. Each work station 100 includes a work station control processor for controlling the operation of the individual work station. The work station control processor is preferably a microprocessor adapted for use in an industrial control system, such as a programmable logic controller (PLC). The work station microprocessor or PLC is desirably programmed to control the operation of the work station, such that each work station is functional outside of the modular assembly system.

The work stations 100 may be any number of operational work stations, particularly those operational work stations used in assembling any number of small products, such as valves used in medical devices, transformers, or fasteners. Examples of such work stations are pick-and-place stations, part presence probes, O-ring loaders, ultra-sonic welders, part torque or screw station, empty nest identifiers, part orientation probes, leak and flow testers, electrical characteristic testers, pneumatic rams, crimpers and formers, liquid dispensers, glue dispensers, ultra violet gluers, machining devices, soldering devices, grinders, finishing and polishing devices, and chargers, to name a few.

Each work station 100 may be detachably connected to the base unit 20, such as by a removable fastener, like a bolt or screw, by an interference fit, or by other fastening means. In one embodiment of the invention, a work station 100 triggers a switch 50 when it is attached to the base unit 20. Each switch is connected to base unit control processor 30. A triggered switch 50 indicates to the base unit control processor 30 that a work station 100 has been attached to the base unit. It should be apparent to one of ordinary skill in the art that the switch may have any number of designs, such as an electromechanical switch triggered when contacted by a work station 100 or manually triggered by a technician connecting a work station 100 to the base unit 20.

When base unit control processor 30 determines that a work station 100 has been attached to the base unit 20, base unit control processor 30 looks to port 40 to identify whether a work station 100 has been connected to communicate with the base unit control processor 30. The communication between the base unit control processor 30 and a work station 100 through a port 40 may be accomplished using a standard communication protocol for connecting industrial equipment to control processors. In the preferred embodiment of the invention, the protocol is the RS-232 standard established by the Electrical Industries Association. It should be apparent, though, that work stations 100 and the base unit control processor 30 may be adapted to communicate using other protocols, such as those mentioned above. As mentioned, the network communications between the base unit control processor 30 and the plurality of work stations 40 may be coordinated through network bus 50 according to a network protocol, such as DEVICENET.

Because each work station preferably includes a work station processor which allows the work station to function independent of the modular assembly system 10, the communication and control requirements of the base unit control processor 30 are greatly simplified and the system thereby becomes truly modular, as is discussed hereafter.

Very little communication is required between a work station 100 and the base unit control processor 30. When a work station 100 is connected to a work station port 40, and a switch 50 indicates to base unit control processor 30 to look to a work station port 40 associated with the switch 50, then base unit control processor 30 initiates communications with the work station 100. Each individual work station 100 is not programmed with a network address to identify its location to the base unit control processor 30 because each work station port 40 is associated with and identified by a network address. Further, base unit control processor 30 recognizes work stations 100 without being preprogrammed with operating instructions for work stations 100 that may be connected to the base unit 20.

The interaction between the work stations 100 and the base unit control processor is best described using an example. Assume base unit 20 includes sixteen work station ports 40 and sixteen associated switches 50. An assembly system including four work stations may be created by connecting work stations 100 to, for example, the first, fifth, ninth, and fifteenth work station ports 40. There are preferably sixteen available locations for work stations to operate on products along the conveyor 60, each location associated with a work station port 40. Indeed, the work stations 100 can be connected to any four work station ports 40, as long as they are connected in the correct assembly order. No addressing is required for the individual work stations 100. Assuming the associated switches 50 indicate to the base unit control processor 30 that work stations 100 are attached to the base unit 20, base unit control processor 30 looks to the associated work station ports 40, here the first, fifth, ninth, and fifteenth work station ports 40, to determine whether work stations 100 are connected to these work station ports 40. Assuming work stations 100 are connected to the work station ports, the communication begins between the connected work stations 100 and the base unit control processor 30. The work stations 100 are preferably connected to the work stations ports 40 through cables which permit data transfer, such as cables designed for serial or parallel data transfer.

The base unit control processor's function is much like that of a traffic cop. The base unit control processor 30 does not need to know what kind of work stations 100 are connected to the base unit 20 or the work station-specific detailed operating instructions particular to each work station. The base unit control processor 30 determines from each work station control processor whether each individual connected work station cycles on a good or bad product. A work station 100 that cycles on a bad product performs its operation when a prior work station 100 has not successfully performed its operation or a product has failed a work station test. An example of such a work station is an unload or dump work station or a work station that reconfigures or reforms a defective product in some manner. A work station that cycles on a good product performs its operation when the prior work stations 100 have successfully performed their respective operations on a product or have successfully tested a product.

A work station 100 may also communicate to the base unit control processor that it is a dual function work station. A dual function work station cycles on both a good and bad product. An example of dual function work station is a rotate station that rotates, flips, or otherwise orients a product to be operated on by a successive work station regardless of whether the product is good or bad.

The base unit control processor 30 also sends start signals to the work stations, receives completion signals from the work stations, and controls the conveyor 60 in order to move a product to successive work stations in accordance with these signals. Once the base unit control processor 30 recognizes each work station 100 and determines the cycle characteristic of each work station 100, the base unit control processor sends a start signal to the first work station 100, that work station connected to the first work station port 40 in the example. The first work station 100 may be a loader for example. The work station 100 loads a product onto the conveyor 60 and communicates a complete signal to base unit control processor 30. The work station also communicates to the base unit control processor 30 whether it has completed its operation successfully or unsuccessfully. The operation of the work station 100, though, is controlled entirely by the work station control processor. The base unit control processor records whether the operation has been completed successfully and, therefore, whether the product is a good or bad product.

The base unit control processor 30 then preferably directs the conveyor 60 to move the product one increment to the next work station location, i.e., the location where a work station would be if connected to the second work station port 40. The base unit control processor 30 could direct the conveyor to move the product to the location where the second connected work station is located, i.e., to the work station 100 connected to the fifth work stations port, but the base unit control processor 30 would then have to account for the separation between each work station. In that situation, products would eventually be spaced on the conveyor such that each work station would not have a product on which to operate, unless the spacing between the work stations is equidistant, e.g., work stations connected to the first, third, fifth, and seventh work stations. After the product is moved to the next location, the base unit control processor again sends a start signal to the first work station 100, and a second product is loaded onto the conveyor 60. The work station control processor then sends a completed signal to the base unit control processor 30 and a successful operation or unsuccessful operation signal.

This same process is repeated until the first product reaches the second work station 100 connected to the fifth work station port 40. The base unit control processor 30 does not know the operating instruction for the particular work station 100 in sufficient detail to direct the entire operation of the work station 100, but the base unit control processor 30 does know whether this work station cycles on a good or bad product, or whether the work stations cycles on both a good and bad product. The base unit control processor also knows from the successful/unsuccessful operation signal for this product sent from the first work station control processor whether this individual product is a good or bad product. If the product is good, i.e., the first work station performed its operation successfully on the product, and the second work station 100 is programmed to cycle on a good product, then base unit control processor 30 sends a start signal to the second work station 100 to perform its operation. The second work station 100, like the first work station 100, eventually sends a complete signal to the base unit control processor 30 and a successful or unsuccessful operation signal. Before directing the conveyor 60 to move the product along the assembly line to successive work stations, the base unit control processor 30 also sends a start signal to the first work station. The base unit control processor awaits a complete signal and successful/unsuccessful operation signal from each work station before directing the conveyor 60 to move the product. The work stations preferably work simultaneously, if directed to do so, as the base unit control processor awaits complete and successful/unsuccessful information from each work station performing an operation.

In the manner described above, the products on the conveyor 60 eventually are moved before the third and fourth work stations 100 connected to the ninth and fifteenth work station ports 40, respectively. The communication between the base unit control processor 30 and the individual work stations 100 is repeated. The base unit control processor 30 simply directs an individual work station 100 to perform its function based on whether the product presently before that particular work station 100 is a good or bad product and whether that particular work station 100 cycles on a good or bad part.

Because the base unit control processor 30 directs traffic and the operation of each work station 100 is directed by a work station control processor, the assembly system 10 is truly modular. The base unit control processor 30 does not identify what product is being assembled or how individual work stations 100 operate. The base unit control processor 30 performs the same simple routine regardless of the number, order, or type of work stations 100 connected to the base unit 20. Further, because the work stations 100 are not programmed with network addresses, they are quickly and easily interchanged or replaced. An assembly line that assembles solenoids may quickly be transformed into an assembly that assembles relays by detaching each work station 100 that is not needed, or that needs to be relocated, from the base unit 10 and the work station ports 40. The associated switches 50 are no longer triggered when the work stations are disconnected and therefore no longer indicate to the base unit control processor 30 that there is a need to communicate through their associated work station ports 40. The work stations 100 needed to assemble the new product are connected to the base unit 10 and work station ports 40 in the correct assembly order, e.g., the loader should be located before other work stations along an assembly line, and the associated switches 50 are again triggered. The base unit control processor recognizes the presence of each work stations connected to a work station port, determines whether each work station cycles on a good or bad product, or on a good and bad product, and sends a start signal to the first work station 100. In this manner, a new assembly system is created with little loss in production time and no reprogramming of either the base unit control processor or the work stations.

It should also be apparent that additional work stations 100 can, in the same manner, simply be added to a sequence of work stations 100 to modify the assembly of a product or perform an additional operation on a product. Similarly, work stations 100 may be removed to modify an assembly line or to be used outside of the automated modular assembly system 10, since the individual work stations 100 control their own operations. This may be extremely valuable to businesses as they modify production emphasis from one product to another. The higher yield products may be assembled on an automated modular assembly system 10, and the lower yield products or products that having reduced demand may then be assembled manually using the replaced work stations 100 without the base unit 10 and conveyor 60. The removed work stations may similarly be used in a semiautomatic system.

Figure 5:
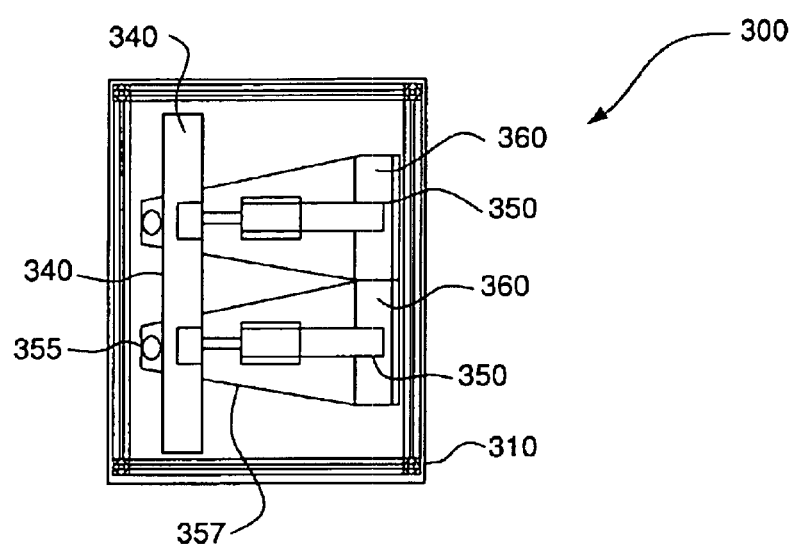
FIG. 5 is a top plan view of an assembly system including manual base unit attached to exemplary work stations according to the present invention.
Figure 6:
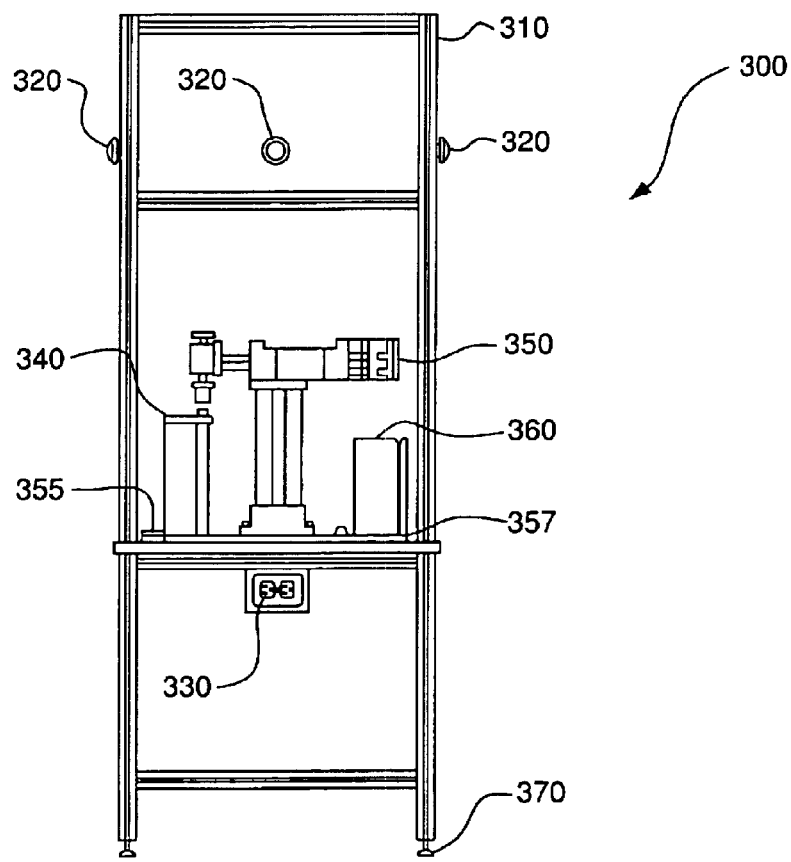
FIG. 6 is a side elevational view of the assembly system of FIG. 5.

FIG. 5 is a top plan view of a manual assembly system 300 including manual base unit 310 and two exemplary work stations 350. FIG. 6 is a side elevational view of the system of FIG. 5. The work stations 350 may be manually triggered to perform their operations on products manually positioned on a nest table 340. The work stations 350 are connected to a support plate 357 that may be connected to the manual base unit 310, such as by fastening bolt 355. Each work station includes a protective chamber 350 for housing a work station control processor (not shown). The manual base unit 310 may include an AC power outlet 330, emergency shut down buttons 320, and adjustable feet 370. As a business grows or it become prudent to switch to an automated system, the work stations 350 may be removed from the manual base unit 310 and connected to an automated modular assembly system. Likewise, work stations from an automated modular assembly system may be removed from the automated modular assembly system and connected to the manual assembly system 300, for example during reduced production periods or production emphasis changes.

FIG. 2 is a top plan view of an exemplary embodiment of a automated modular assembly system 500 according to the present invention including a dial or rotating index conveyor 510. FIG. 3 is a side elevational view of the modular assembly system 500 of FIG. 2. The base unit 520 includes the base unit control processor (not shown) and inputs 530 to work station ports (not shown). Each work station 540 may include an enclosed chamber 545 for protecting the work station control processor and is connected to an input 530 through a connecting cable 550. The work stations 540 may be attached to the base unit 520 at connectors 560. Connectors 560 each include a switch (not shown) that indicates to the base unit control processor that a work station is attached to the base unit 520.

The modular assembly system 500, as shown in FIG. 2 and FIG. 3, may include, for example, sixteen inputs 530 to sixteen work station ports. The modular assembly system 500 as shown is capable of accommodating up to sixteen work stations and therefore includes sixteen connectors 560. It should be apparent that the modular assembly system 500 can accommodate different combinations of sixteen or less work stations without reprogramming the work stations or base unit control processor. The base unit control processor simply recognizes which work station ports have connected work stations 540, determines whether each work station cycles on a good or bad product, or both a good and bad product, sends a start signal to the first work station, and monitors the complete and successful/unsuccessful return signals. The base unit control processor of base unit 520 also directs the dial index conveyor 510 to rotate to move the products through assembly.

FIG. 4 is a perspective view of an exemplary embodiment of a base unit 700 according to the present invention with exemplary work stations that may be connected to the base unit 700. Base unit 700 includes a dial index conveyor 790 that is controlled by a base unit control processor (not shown). The base unit 700 includes sixteen connectors 900 for mating with anchors 800 of the work stations. The connectors 900 may include switches (not shown) that are triggered when a work station is attached to the base unit 700. The base unit 700 may also include an operating panel 780 which permits a technician to turn on the base unit 700, turn off the base unit 700, monitor the base unit 700, or otherwise control the base unit 700. Further, the base unit 700 may include selectively placed emergency shut down switches or buttons 1000. Inputs 770 permit the work stations to plug into the work station ports (not shown) in order to communicate with the base unit control processor.

Several exemplary detachable work stations 710, 720, 730, 740, 750, 760 are shown which may be connected to base unit 700 to form and assembly system. The work stations are shown as examples of exemplary detachable work stations and are merely illustrative of work stations that may be used in a modular assembly system. Work station 760 is a glue dispenser. Work stations 760 includes a work station control processor (not shown) within chamber 765. The work station control processor may be connected through cable 850 to an input 770 of the base unit 700. Other work stations are also depicted in FIG. 4. Work station 710 is an optical position sensor, work stations 730 is a rotary pick-and-place device, work stations 740 is another pick-and-place device, work station 750 is a light duty ram, and work station 720 is a ultraviolet curing device.

Work stations 720 is an example of a double-wide device. The work station occupies two locations along or around an assembly line, but is controlled by one work station control processor. The work station control processor of a double-wide work station indicates to the base unit control processor the additional information that it is a double-wide work station processor. The base unit control processor recognizes that a single work station processor is responsible for two locations along a conveyor, such as dial index conveyor 790. The base unit control processor communicates through a single work stations port connected to the work station processor of work station 720, thereby allowing the same work station processor to operate at two locations.

Although the invention has been described in terms of exemplary embodiments, it is not limited thereto. Rather, the appended claims should be construed broadly to include other variants and embodiments of the invention that may be made by those skilled in the art without departing from the scope and range of equivalents of the invention. For example, an exemplary modular assembly system may include work stations that are not described herein or be used to manufacture numerous products not described. Further, the modular assembly system has been described using an exemplary base unit configured to accept sixteen work stations. This exemplary embodiment is presented for illustrative purposes only, and one of ordinary skill in the art should recognize that base units may be configured to accept fewer or more work stations.

What is claimed is:

1. A modular product assembly system, comprising:
   a base unit comprising:
      a base unit controller;
      a plurality of work stations, each of said work stations including control means for directly controlling an operation of said work station on a product substantially independently of said base unit controller; and
      conveying means disposed proximate to said plurality of work stations for moving said product to said plurality of work stations during an assembly of said product, said base unit controller including means for monitoring whether at least one of said work stations successfully performs its operation on said product and selectively directs at least a successive one of said work stations to perform its operation on said product based on said monitoring.

2. The modular assembly system of claim 1, wherein a plurality of combinations of said work stations may be coupled to said base unit to assemble a second, different product without said base unit controller being programmed specific to said second product.

3. The modular assembly system of claim 1, wherein said base unit controller includes means for recognizing said work stations without being programmed with instructions for operating each of said work stations.

4. The modular assembly system of claim 1, wherein said base unit includes a plurality of work station ports coupled to said base unit controller through a network, each of said ports being identifiable by a different address, each of said work stations beings coupled to a respective work station port.

5. The modular assembly system of claim 4, said base unit further comprising a plurality of switches, each of said switches associated with a respective work station port, a triggered one of said switches indicating to said base unit controller an attachment of a respective work station to said base unit.

6. The modular assembly system of claim 5, wherein said base unit controller includes means for recognizing a work station connected to a work station port after an associated one of said switches is triggered.

7. The modular assembly system of claim 1, wherein at least one of said work stations performs its operation on an individual product only when at least one prior work station does not successfully perform its operation on said product.

8. The modular assembly system of claim 7, wherein at least one of said work stations performs its operation on an individual product only when all prior work stations successfully perform their respective operations on said product.

9. A method of modular manufacturing, comprising the steps of:
(a) providing a modular assembly system including a base unit comprising a base unit controller, a plurality of work stations and conveying means disposed proximate to said plurality of work stations;
(b) detachably connecting said plurality of work stations proximate to said conveyor of said base unit, said conveyor being adapted to move a product during assembly of said product responsive to commands from said base unit controller, each of said work stations including control means for directly controlling an operation of said work station on said product substantially independently of said base unit controller;
(c) monitoring with said base unit controller whether at least one of said work stations successfully performs its operation on said product; and
(d) selectively directing at least a successive one of said work stations to perform its operation on said product based on said monitoring.

10. The method of claim 9, further comprising the step of:
(e) detachably connecting a second plurality of work stations in a predetermined combination and sequence to assemble a second, different product without said base unit controller being programmed specific to said second, different product.

11. The method of claim 10, wherein step (e) includes the step of providing at least one additional work station to assemble said second, different product.

12. The method of claim 10, wherein step (e) includes the step of detaching at least one work station from said base unit to assemble said second, different product.

13. The method of claim 9, wherein said detachably connecting step includes the step of triggering an associated switch to indicate an attachment of each work station to said base unit.

14. The method of claim 9, wherein said selectively directing step includes the step of directing a work station that cycles on a good product from said plurality of work stations to perform its operation on an individual product only when all prior work stations successfully perform their respective operations on said product.

15. The method of claim 9, wherein said selectively directing step includes the step of directing a work station that cycles on a bad product from said plurality of work stations to perform its operation on said product only when at least one prior work station does not successfully perform its operation on said product.

16. A base unit for a modular automated assembly system, comprising:
a base unit comprising:
conveying means for moving a product during assembly of said product responsive to commands from a base unit controller; and
a base unit controller, said controller including:
means for monitoring whether at least one of a plurality of work stations detachably connected to said base unit successfully performs its operation on an individual product; and
means for selectively directing at least a successive one of said work stations to perform its operation on said individual product, in accordance with control programming at said at least one successive work station, based upon said monitoring and based upon information from said at least one successive work station identifying under what conditions it is to perform its operation.

17. The base unit of claim 16, wherein said information indicates whether said at least one successive work station performs its operation only when at least one prior detachable work station does not successfully perform its operation on said product, only when all prior work stations successfully perform their operation on said product, or regardless of success or prior work stations.

18. The base unit of claim 16, wherein a plurality of combinations of said work stations may be coupled to said base unit to assemble different products without said base unit controller being programmed specific to said different products.

19. The base unit of claim 16, wherein said base unit controller includes means for recognizing said work stations without being programmed with instructions for operating each of said work stations.

20. The base unit of claim 16, wherein said base unit includes a plurality of work station ports coupled to said base unit controller through a network, each of said ports being identifiable by a different address, each of said work station ports being configured to couple to a respective work station.

* * * * *